(12) United States Patent  
Hirakata

(10) Patent No.: US 7,923,161 B2  
(45) Date of Patent: Apr. 12, 2011

(54) FUEL CELL SYSTEM

(75) Inventor: Shuji Hirakata, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 539 days.

(21) Appl. No.: 11/883,764

(22) PCT Filed: Feb. 8, 2006

(86) PCT No.: PCT/JP2006/002592  
§ 371 (c)(1),  
(2), (4) Date: Aug. 6, 2007

(87) PCT Pub. No.: WO2006/085674  
PCT Pub. Date: Aug. 17, 2006

(65) Prior Publication Data  
US 2008/0118797 A1 May 22, 2008

(30) Foreign Application Priority Data  
Feb. 9, 2005 (JP) ................. 2005-033631

(51) Int. Cl.  
*H01M 8/04* (2006.01)  
*B60L 11/08* (2006.01)

(52) U.S. Cl. ........ 429/430; 429/428; 429/429; 429/433; 701/22

(58) Field of Classification Search ............... 429/34  
See application file for complete search history.

(56) References Cited

U.S. PATENT DOCUMENTS

| 5,811,895 | A | * | 9/1998 | Suzuki et al. | ............... 307/125 |
| 5,903,064 | A | | 5/1999 | Norberg | |
| 5,931,245 | A | | 8/1999 | Uetake et al. | |
| 6,964,821 | B2 | | 11/2005 | Hirakata | |
| 2003/0122526 | A1 | * | 7/2003 | Fujii | ............... 320/149 |
| 2003/0134167 | A1 | * | 7/2003 | Hirakata | ............... 429/22 |
| 2004/0081870 | A1 | | 4/2004 | Miyazawa et al. | |
| 2005/0140339 | A1 | * | 6/2005 | Fujii | ............... 320/163 |
| 2005/0181246 | A1 | | 8/2005 | Nakaji | |
| 2005/0218865 | A1 | * | 10/2005 | Fujii | ............... 320/106 |
| 2005/0237030 | A1 | * | 10/2005 | Takenaka | ............... 320/150 |

FOREIGN PATENT DOCUMENTS

| JP | A-07-039012 | | 2/1995 |
| JP | A-07-193902 | | 7/1995 |
| JP | 11069638 A | * | 3/1999 |
| JP | A-2001-351667 | | 12/2001 |
| JP | A-2003-151601 | | 5/2003 |

(Continued)

OTHER PUBLICATIONS

Machine translation of JP 11069638, Hashimoto, Mar. 1999.*  
Machine translation of JP 2004014185 A, Kikawa et al., Jan. 2004.*  
Foreign Office Action dated Sep. 17, 2010 in German Patent Application No. 11 2006 000 343.7-32 (with translation).

*Primary Examiner* — Basia Ridley  
*Assistant Examiner* — Seam P Cullen  
(74) *Attorney, Agent, or Firm* — Oliff & Berridge, PLC

(57) ABSTRACT

An ECU (114) determines a connection state between a vehicle (200) and an external power supply (300) based on a resistance detected by a resistance detector (106). When the vehicle (200) and the external power supply (300) are connected, power supply from an FC (102) to a drive motor (204) is interrupted by turning off a switch (116) to prevent wiring (105) from having breakage etc. by movement of the vehicle (200), thus inhibiting movement of the vehicle (200).

6 Claims, 4 Drawing Sheets

FOREIGN PATENT DOCUMENTS

| | | |
|---|---|---|
| JP | A-2004-014185 | 1/2004 |
| JP | A-2004-1461 I3 | 5/2004 |
| JP | A-2004-158333 | 6/2004 |
| WO | WO 97/10967 A1 | 3/1997 |

* cited by examiner

FUEL CELL SYSTEM

TECHNICAL FIELD

The present invention relates to a fuel cell system in which electric power is supplied to respective portions of a movable body from a fuel cell mounted in the movable body such as a vehicle.

BACKGROUND ART

Over the recent years, vehicles mounted with fuel cells have been developed in order to have consideration for environmental factors and to improve fuel consumption. A fuel cell system supplying the electric power to the respective portions of the vehicle from this type of fuel cell embraces a proposal of a technology of inhibiting the vehicle from moving when replenishing the fuel cell with a fuel (refer to, e.g., Japanese Patent Application Laid-Open Publication No. 2001-351667). Further, such a technology is proposed as to inhibit the vehicle from moving also when charging a general type of battery with electricity (refer to, e.g., Japanese Patent Application Laid-Open Publication No. 7039012).

Other known technologies are disclosed in Japanese Patent Application Laid-Open Publication No. 2004-14185, Japanese Patent Application Laid-Open Publication No. 2004-158333, Japanese Patent Application Laid-Open Publication No. 2003-151601, Japanese Patent Application Laid-Open Publication No. 2004-146113, etc.

DISCLOSURE OF THE INVENTION

The technology disclosed in Japanese Patent Application Laid-Open Publication No. 2001-351667, however, entails using a sensor for detecting opening-and-closing states of a fuel lid when replenished with the fuel. Further, the technology disclosed in Japanese Patent Application Laid-Open Publication No. 2001-351667 also needs to employ a detection switch for detecting a connection of a power supply connector. This type of sensor or detection switch comes under a switch that generally involves a mechanical operation, and there is, it is assumed, a case where an environmental drastic change might occur in the vicinity of an opening/closing portion of the fuel lid or in the vicinity of a connecting portion of the power connector. Accordingly, it follows that these sensors are, when used in the vicinity of the connecting portion between the movable body such as the vehicle and a device disposed outside the movable body, requested to have high durability in the severe environment.

It is an object of the present invention to provide a technology capable of determining the connection between the movable body and the device outside the movable body and inhibiting the movable body from moving without providing the sensor in the vicinity of the connecting portion between the movable body and the device outside the movable body in the case of connecting the movable body mounted with the fuel cell to the device outside the movable body.

The present invention adopts the following means in order to solve the problems. Namely, a fuel cell system according to the present invention comprises: a movable body mounted in a movable body; external connecting means that connects the movable body to an external power source provided outside the movable body; connection determining means that determines whether or not the movable body is connected to the external power source via the external connecting means; and movement inhibiting means that inhibits the movable body from moving if the connection determining means determines that the movable body is connected to the external power source via the external connecting means.

With this construction, when the movable body mounted with the fuel cell is connected to the external power source, the movable body is inhibited from moving. It should be noted that the connection determining means is, it is preferable, disposed away from the external connecting means connecting the movable body to the external power source provided outside the movable body, and remotely determines about the connection.

The fuel cell system may further comprise notifying means notifying that the movement inhibiting means inhibits the movable body from moving.

This construction enables a user to easily recognize a cause that the movable body does not move.

In the fuel cell system, the movable body may include a drive motor that powers the movable body to move, and the movement inhibiting means may cut off supply of electric power to the drive motor.

With this construction, the movable body can be inhibited from moving by stopping rotations of a drive motor.

The fuel cell system may further comprise: an auxiliary machine unit utilized for maintaining and managing an operating environment of the fuel cell; and power supply control means that controls the supply of the electric power to the auxiliary machine unit from the fuel cell and the external power source. This construction enables, when the vehicle is connected to the external power source in order to operate the auxiliary machine unit, the movable body to be properly inhibited from moving.

In the fuel cell system, the power supply control means may include connection switching means that switches over a state between the external connecting means and the auxiliary machine unit to a connected state or a disconnected state, and the connection determining means may determine, when the connection switching means switches over the state between the external connecting means and the auxiliary machine unit to the disconnected state, whether the external power source is connected to the external connecting means or not. This construction eliminates influence of a resistance value held by the auxiliary machine unit and, in addition, makes it possible to determine whether or not the external power source is connected to the external connecting means.

In the case where the movable body mounted with the fuel cell is connected to the device disposed outside the movable body, it is feasible to determine about the connection between the movable body and the device disposed outside the movable body without providing the sensor in the vicinity of the connecting portion between the movable body and the device disposed outside the movable body, and to inhibit the movable body from moving.

BEST MODE FOR CARRYING OUT THE INVENTION

A fuel cell system according to a best mode (which will hereinafter be termed an embodiment) for carrying out the present invention will hereinafter be described with reference to the drawings. It should be noted that a configuration in the following embodiment is an exemplification, and the present invention is not limited to the configuration in the embodiment.

Figure 1:
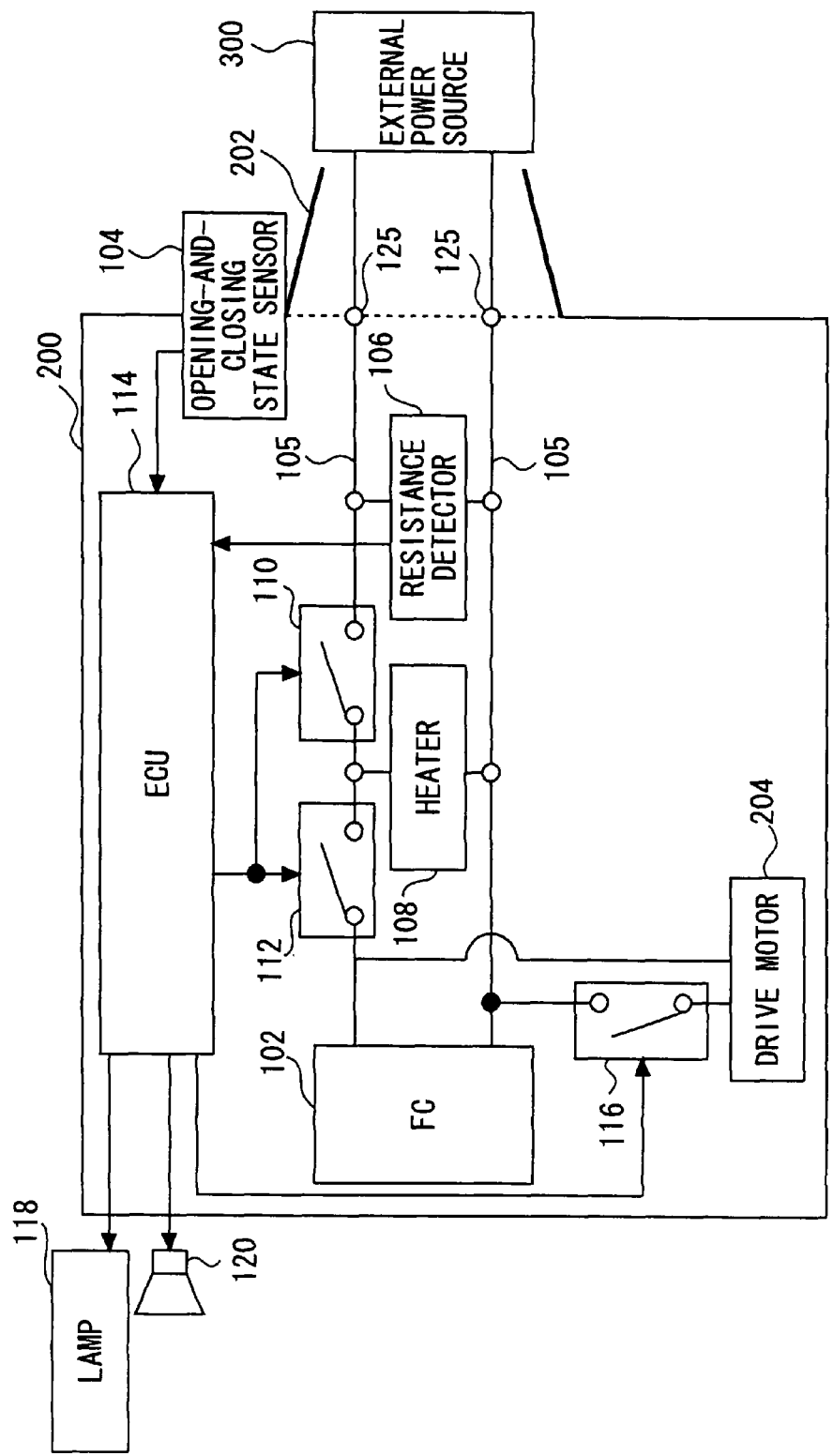
FIG. 1 is a diagram illustrating a construction of a fuel cell system according to an embodiment of the present invention.

FIG. 1 is a diagram of a configuration of the fuel cell system according to the embodiment of the present invention. The fuel cell system illustrated in FIG. 1 is built up within a vehicle 200. The fuel cell system supplies electric power to a drive motor 204 that powers the vehicle 200 to move, and includes a fuel cell (FC) 102, an opening-and-closing state sensor 104, a wiring 105, a resistance detector 106, a heater 108, switches 110, 112, an electronic control unit (ECU) 114, a switch 116, a lamp 118 and a loudspeaker 120.

The FC 102 is so constructed as to be connectable to an external power source 300 provided outside the vehicle 200 via the switch 112, the wiring 105 and an external terminal 125 (corresponding to external connecting means according to the present invention).

Further, an output terminal of the FC 102 is connected to the drive motor 204 via the switch 116.

The opening-and-closing state sensor 104 is, e.g., a touch sensor and detects opening-and-closing states of a lid portion 202. This lid portion 202 gets, when opened, the wiring 105 exposed to the outside of the vehicle 200, whereby the vehicle 200 is made connectable to the external power source 300. A result of how the opening-and-closing state sensor 104 detects the opening-and-closing states of the lid portion 202, is sent to the ECU 114.

The heater 108 is connected in parallel with the FC 102 between a switch 110 (corresponding to connection switching means according to the present invention) and the switch 112, which are provided on the wiring 105 (the switch 110, the switch 112 and the ECU 114 correspond to power supply control means according to the present invention). The heater 108 is defined as an auxiliary machine unit for warming up the FC 102 by its being supplied with the electric power from the FC 102 and from the external power source 300 in order to prevent, when at a low temperature, the FC 102 from being frozen or declining in terms of start-up property. Another available construction is, it is to be noted, such that together with the heater 108, a water pump and a valve are connected in parallel with the heater 108 between the switch 110 and the switch 112. In this case, the water pump and the valve each serving as the auxiliary machine unit can be also employed for warming up the FC 102 by their being supplied with the electric power from the external power source 300.

The resistance detector 106 detects resistance between the external terminals 125 and 125, and notifies the ECU 114 of the detected resistance. The resistance detector 106 can be, as broadly known, constructed of a voltage source and a current sensor, or of the voltage source, a voltage sensor and the current sensor.

It should be noted that in the fuel cell system according to the present embodiment, the resistance detector 106 can, it is sufficient, measure the resistance between the external terminals 125 and 125 via the wiring 105, and hence the resistance detector 106 does not need fitting in the vicinity of the external terminal 125 serving as the connecting portion between the vehicle 200 and the external power source 300. Therefore, the resistance detector 106 does not need to be fitted in a severe environment exposed to the outside air. For example, the resistance detector 106 may be fitted, within the vehicle 200, in a position protected from the external environment.

The ECU 114 controls an operation of the fuel cell system. The ECU 114 obtains the opening-and-closing states of the lid portion 202 that are detected by the opening-and-closing state sensor 104, and reads the resistance value detected by the resistance detector 106 (the resistance detector 106 and the ECU 114 correspond to connection determining means according to the present invention). Then, the ECU 114 controls the switch 116, corresponding to the opening-and-closing states of the lid portion 202 and the resistance value detected by the resistance detector 106. Under this control, when the switch 116 is in an ON-status, the drive motor 204 is supplied with the electric power from the FC 102 so as to enable the vehicle 200 to move, and, when the switch 116 (corresponding to movement inhibiting means according to the present invention) is in an OFF-status, the supply of the electric power to the drive motor 204 from the FC 102 is cut off so as to inhibit the movement of the vehicle 200.

In the fuel cell system according to the present embodiment, however, the ECU 114, before reading the resistance value from the resistance detector 106, disconnects the switch 110, thereby isolating the auxiliary machine unit such as the heater 108 from the external terminal 125. With this operation, the ECU 114 eliminates influence of the resistance value of the auxiliary machine unit such as the heater 108 connected to the external terminal 125 via the wiring 105, and can thereafter precisely determine whether the external power source 300 is connected to the external terminal 125 or not.

Further, the ECU 114 performs, corresponding to the state of the switch 116, the control of lighting up the lamp 118 and outputting a predetermined alarm tone from the loudspeaker 120 (the lamp 118 and the loudspeaker 120 correspond to notifying means according to the present invention).

Moreover, the ECU 114, if required to warm up the FC 102, switches ON at least any one of the switch 110 and the switch 112. This switch-ON operation leads to the supply of the electric power to the heater 108 from at least any one of the FC 102 and the external power source 300, whereby the heater 108 is heated up to warm up the FC 102.

Figure 2:
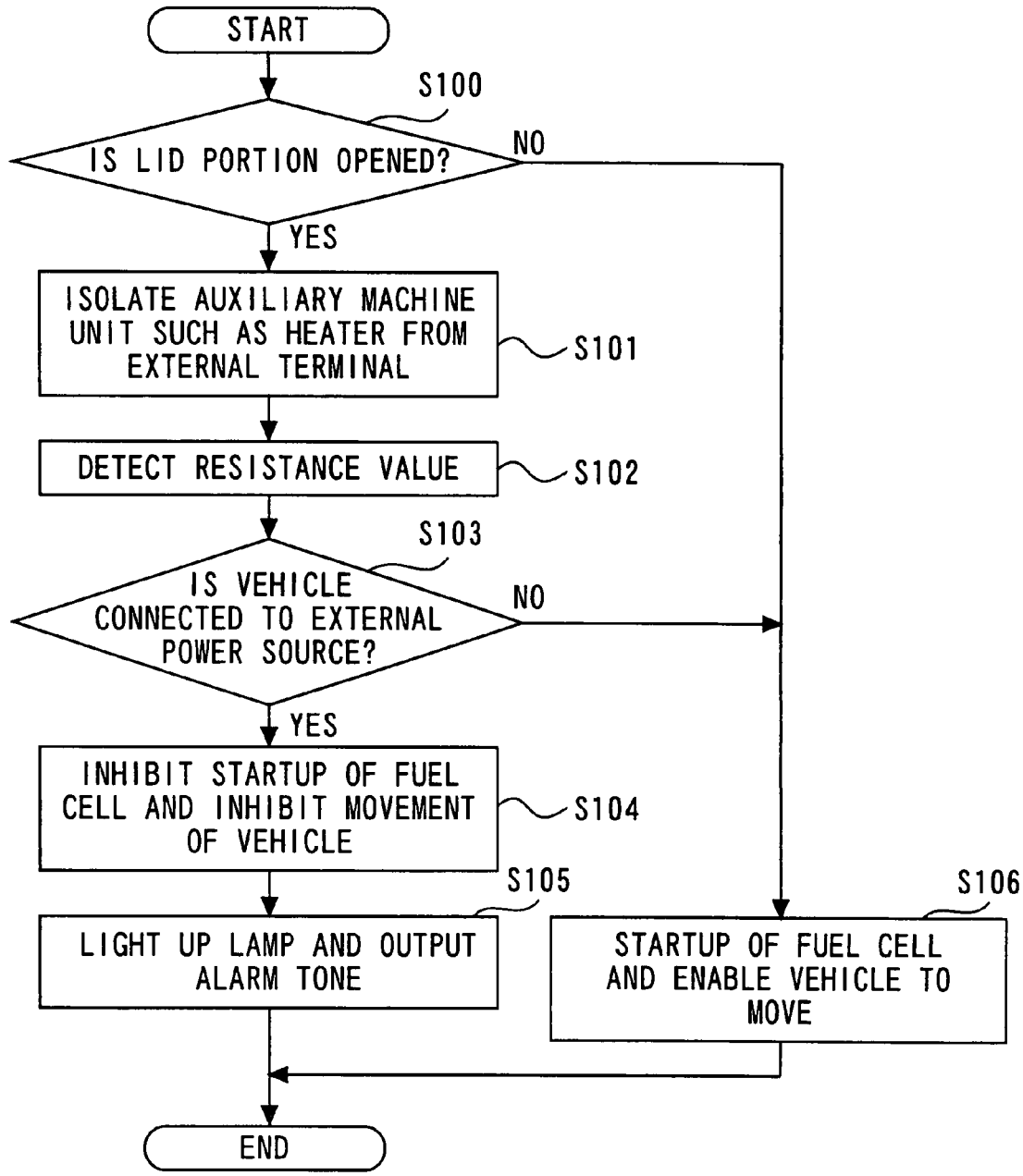
FIG. 2 is a flowchart showing a first operation of the fuel cell system.

Next, the operation of the fuel cell system will be described with reference to a flowchart. FIG. 2 is a flowchart showing a first operation of the fuel cell system. FIG. 2 illustrates the operation when starting up the FC 102.

The ECU 114 obtains the opening-and-closing states of the lid portion 202 that are detected by the opening-and-closing state sensor 104, and determines whether the lid portion 202 is opened or not (S100). When the lid portion 202 is opened, the ECU 114 isolates the auxiliary machine unit such as the heater 108 from the external terminal 125 by breaking the switch 110 (S101).

Then, the ECU 114 reads the resistance value detected by the resistance detector 106 (S102), and determines based on the detected resistance value whether or not the vehicle 200 is connected to the external power source 300 via the wiring 105 (S103). When the vehicle 200 is connected to the external power source 300 via the wiring 105 and the external terminal 125, the resistance value between the external terminals 125 and 125 comes to a predetermined value.

While on the other hand, when the vehicle 200 is not connected to the external power source 300 via the wiring 105 and the external terminal 125, the resistance value between the external terminals 125 and 125 takes a large value (an open-circuit state) equivalent to insulation resistance in the air. Accordingly, the ECU 114 can determine, from knowing whether the detected resistance value exceeds the predetermined value or not, the connection state between the vehicle 200 and the external power source 300.

When the vehicle 200 is connected to the external power source 300 via the wiring 105 and the external terminal 125 and when the vehicle 200 moves, the wiring 105 or the external terminal 125 might be damaged, and so on. Hence, the ECU 114 conducts the control of inhibiting the vehicle 200 from moving (S104). To be specific, the ECU 114 sets the switch 116 in the OFF-state. The supply of the electric power to the drive motor 204 from the FC 102 is thereby cut off, and the drive motor 204 is not driven, with the result that the movement of the vehicle 200 is inhibited.

Then, when the vehicle 200 is inhibited from moving, the ECU 114 executes the control of lighting up the lamp 118 and outputting the predetermined alarm tone from the loudspeaker 120 in order to notify of this purport (S105).

While on the other hand, when the vehicle 200 is not connected to the external power source 300 via the wiring 105 (in the case of negative determination in S104), it does not happen that the wiring 105 is damaged even when the vehicle 200 moves. Therefore, the ECU 114 carried out the control of enabling the vehicle 200 to move by starting up the fuel cell system (S106). Specifically, the ECU 114 sets the switch 116 in the ON-state. The electric power is thereby supplied to the drive motor 204 from the FC 102, and the drive motor 204 can be driven, with the result that the vehicle 200 is enabled to move.

Further, when the lid portion 202 is closed (in the case of the negative determination in S101), the vehicle 200 is not connected to the external power source 300 via the wiring 105, and therefore, even when the vehicle 200 moves, it does not happen that the wiring 105 is damaged. Hence, the ECU 114 performs the control of enabling the vehicle 200 to move by starting up the fuel cell system (S106).

Thus, in the fuel cell system according to the present invention, the ECU 114 determines, from the resistance value detected by the resistance detector 106, about the connection state between the vehicle 200 and the external power source 300, and, when the vehicle 200 is connected to the external power source 300, in order to prevent the wiring 105 from being damaged due to the movement of the vehicle 200, the vehicle 200 is inhibited from moving by cutting off the supply of the electric power to the drive motor 204 from the FC 102 in a way that sets the switch 116 in the OFF-state. Accordingly, in the case of connecting the vehicle 200 mounted with the FC 102 to the external power source 300, the vehicle 200 can be properly inhibited from moving.

Moreover, in the fuel cell system according to the present embodiment, the ECU 114, on the occasion of reading the resistance value detected by the resistance detector 106 between the external terminals 125 and 125, isolates the auxiliary machine unit such as the heater 108 from the external terminal 125. Accordingly, the ECU 114 can determine securely whether or not the external power source 300 is connected to the external terminal 125. It is therefore feasible to effectively inhibit the vehicle 200 from starting its movement by determining securely whether or not the vehicle 200 is connected to the external power source 300 even if the opening-and-closing state sensor 104 gets into a failure.

Figure 3:
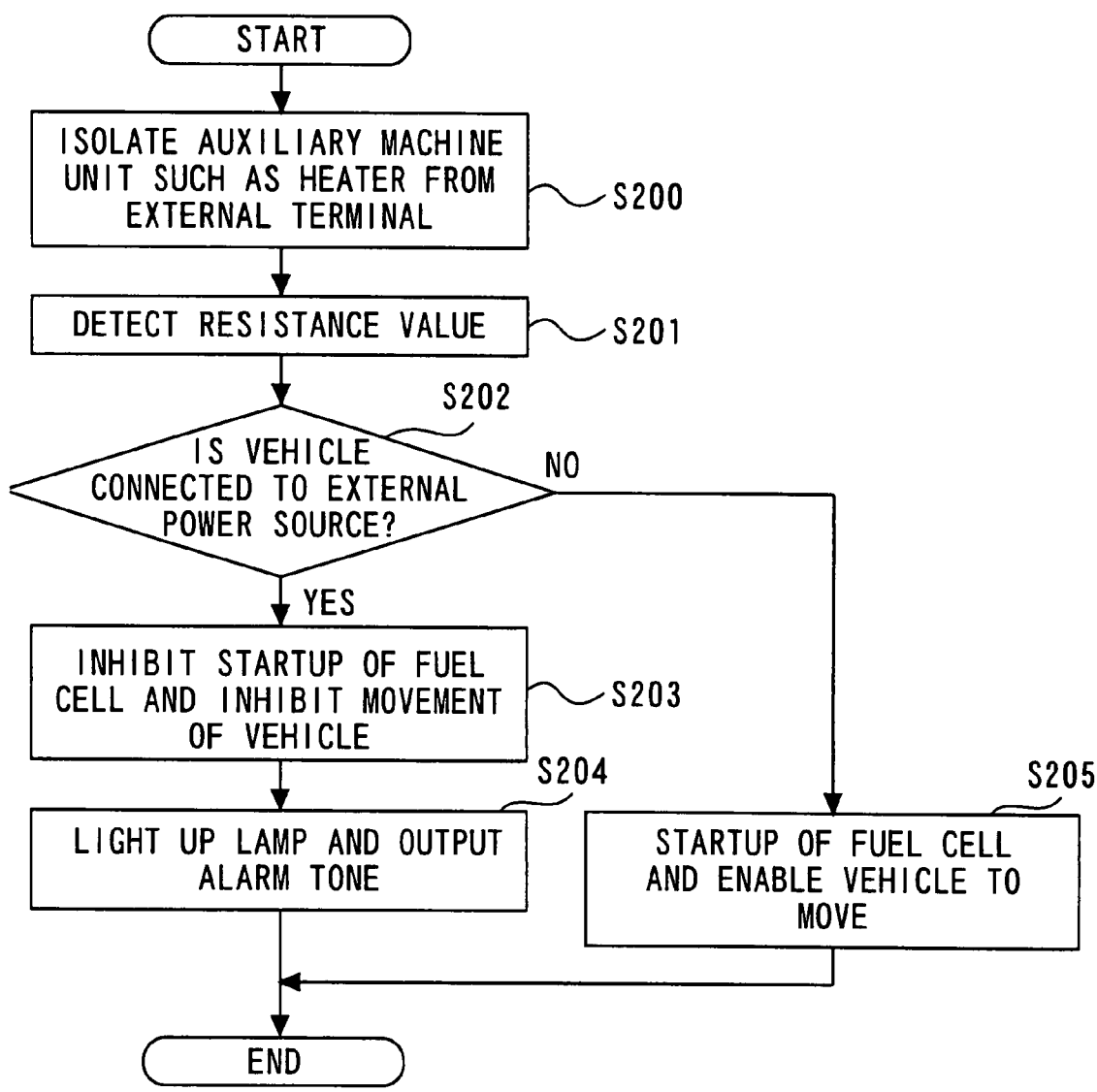
FIG. 3 is a flowchart showing a second operation of the fuel cell system.

It should be noted that the vehicle 200 is provided with the lid portion 202 for enabling the vehicle 200 to connect with the external power source 300 in the embodiment discussed above, however, the present invention can be applied to vehicles having none of the lid portion 202. FIG. 3 is a flowchart showing an operation (a second operation) of the fuel cell system in a case where the vehicle 200 is not provided with the lid portion 202.

FIG. 3 illustrates the operation when starting up the FC 102, wherein the operation is the same as the operation in FIG. 2 other than executing the operation in S101 in FIG. 2. To be specific, the ECU 114, to begin with, isolates the auxiliary machine unit such as the heater 108 from the external terminal 125 by breaking the switch 110 (S200). Next, the ECU 114 reads the resistance value detected by the resistance detector 106 (S201), and determines based on the detected resistance value whether or not the vehicle 200 is connected to the external power source 300 via the wiring 105 and the external terminal 125 (S202). Then, when the vehicle 200 is connected to the external power source 300 via the wiring 105 and the external terminal 125, the ECU 114 performs the control of inhibiting the vehicle 200 from moving (S203) and also the control of lighting up the lamp 118 and outputting the predetermined alarm tone from the loudspeaker 120 in order to notify of the purport that the vehicle 200 is inhibited from moving (S204).

While on the other hand, when the vehicle 200 is not connected to the external power source 300 via the wiring 105 (in the case of the negative determination in S202), the ECU 114 executes the control of enabling the vehicle 200 to move by starting up the fuel cell system (S205).

Thus, in the fuel cell system according to the present embodiment, the connection between the vehicle 200 and the external power source 300 is determined without providing the sensor for determining the connected/unconnected states in the vicinity of the external terminal 125 defined as the connecting portion between the vehicle 200 and the external power source 300. Namely, the resistance detector 106 detects the resistance value of the external terminal 125 remotely by making use of the wiring 105 employed originally for supplying the electric power to the heater 108 from the external power source 300.

Further, the ECU 114 determines, by reading the resistance value detected by the resistance detector 106, whether or not the vehicle 200 is connected to the external power source 300, whereby the vehicle 200 can be properly inhibited from starting its movement. Accordingly, the fuel cell system according to the present embodiment has no necessity of providing the sensor for detecting the connection in the vicinity of the external terminal 125.

Moreover, in the fuel cell system according to the present embodiment, the ECU 114, on the occasion of reading the resistance value detected by the resistance detector 106 between the external terminals 125 and 125, isolates the auxiliary machine unit such as the heater 108 from the external terminal 125. The ECU 114 can therefore determine whether the external power source 300 is securely connected to the external terminal 125 or not.

Figure 4:
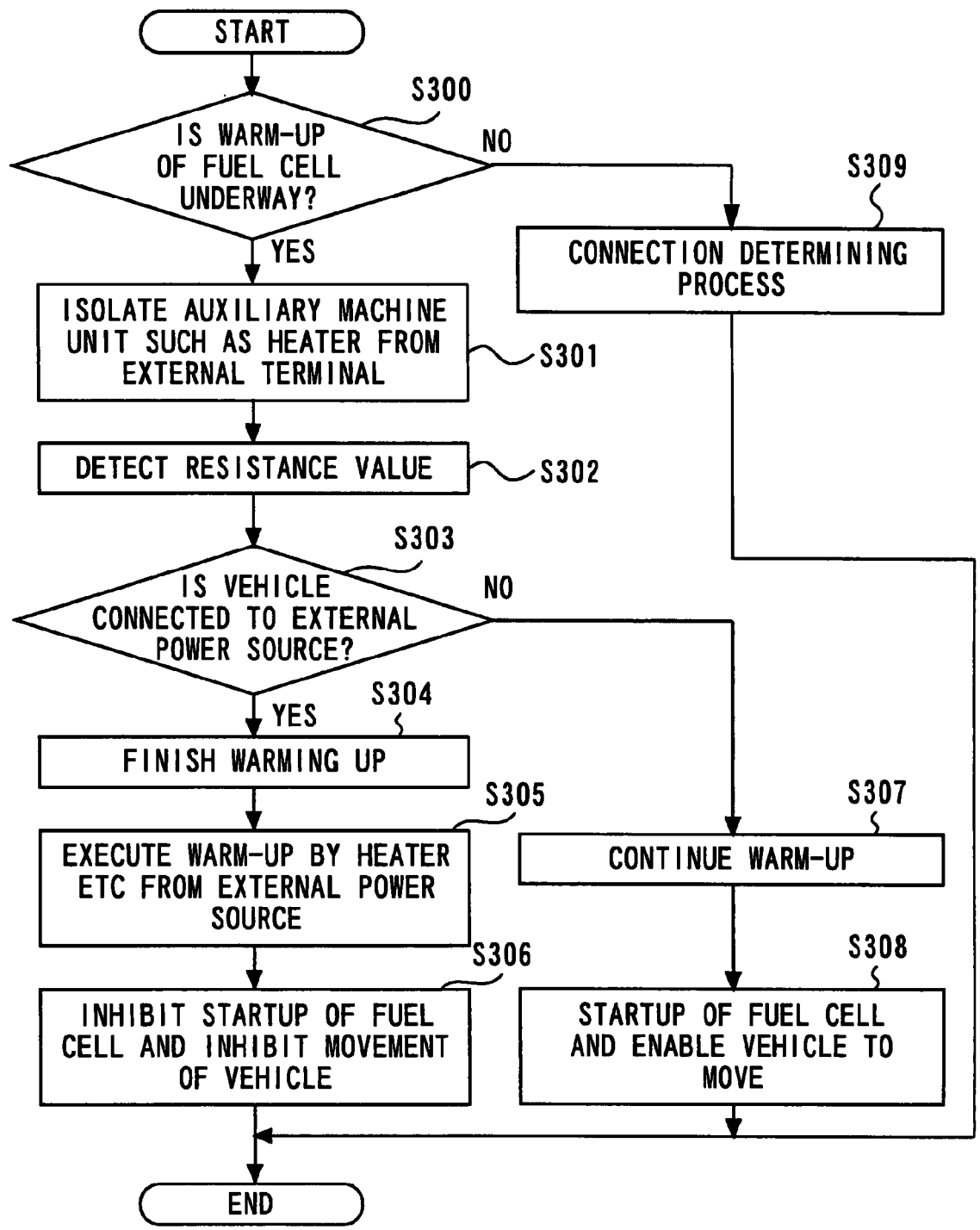
FIG. 4 is a flowchart showing a third operation of the fuel cell system.

Further, the embodiment discussed above has exemplified the FC 102 when started up, however, the present invention can be applied to a case in which the warm-up of FC 102 is underway. FIG. 4 is a flowchart showing an operation (a third operation) of the fuel cell system in the case of warming up the FC 102. Note that the vehicle 200 is, it is assumed, not provided with the lid portion 202 in FIG. 4 in the same way as in FIG. 3.

The ECU 114 determines whether the warm-up of the FC 102 is underway or not (S300). Hereat, when the switch 110 is in the ON-state, the electric power is supplied to the heater 108 from the external power source 300 and is thus heated up, thereby warming up the FC 102. Further, when the switch 112 is in the ON-state, the electric power is supplied to the heater 108 from the FC 102 and is thus heated up, thereby warming up the FC 102. Accordingly, the ECU 114, when at least any one of the switch 110 and the switch 112 is in the ON-state, determines that the warm-up of the FC 102 is underway.

If the warm-up of the FC 102 is not underway, a connection determining process is executed (S309). The connection determining process is substantially the same as a loop of processes in S200 through S205, and hence its description is omitted.

Whereas if the warm-up of the FC 102 is underway, the ECU 114 isolates the auxiliary machine unit such as the heater 108 from the external terminal 125 (S301). Next, the ECU 114 reads the resistance value detected by the resistance detector 106 (S302), and determines based on this resistance value whether or not the vehicle 200 is connected to the external power source 300 via the wiring 105 (S303). When the vehicle 200 is connected to the external power source 300 via the wiring 105, the priority is given to the warm-up of the heater 108 etc from the external power source 300 rather than the warm-up operation by the FC 102 in order to save consumption of a fuel gas within a fuel tank. Therefore, the ECU 114 finishes warming up the FC 102 (S304), and conducts the control of energizing the heater 108 etc from the external power source 300 after reconnecting the heater 108 to the external terminal 125 (S305). Furthermore, the ECU 114 inhibits the vehicle 200 from moving (S306).

While on the other hand, when the vehicle 200 is not connected to the external power source 300 via the wiring 105 (in the case of the negative determination in S303), the ECU 114 continues to warm up the FC 102 because of being disabled to heat up by the heater 108 etc from the external power source 300 (S307). Moreover, the ECU 114 starts up the fuel cell system to enable the vehicle 200 to move (S308).

As discussed above, the scheme of each working example is that the vehicle 200 is inhibited from moving by stopping the supply of the electric power to the drive motor 204 while breaking the switch 116. The implementation of the present invention is not limited to this scheme. For instance, when the vehicle 200 is connected to the external power source 300, the ECU 114 may conduct the control to operate a brake that stops rotations of unillustrated traveling wheels.

INDUSTRIAL APPLICABILITY

When the movable body mounted with the fuel cell is connected to the external power source, the movable body is inhibited from moving, thereby preventing the damage etc to the wiring that connects the movable body to the external power source and reducing the costs.

FIG. 1:
118 . . . LAMP,
104 . . . OPENING-AND-CLOSING STATE SENSOR,
108 . . . HEATER,
106 . . . RESISTANCE DETECTOR,
300 . . . EXTERNAL POWER SOURCE,
204 . . . DRIVE MOTOR,
FIG. 2:
A . . . START,
S100 . . . IS LID PORTION OPENED?
S101 . . . ISOLATE AUXILIARY MACHINE UNIT SUCH AS HEATER FROM EXTERNAL TERMINAL,
S102 . . . DETECT RESISTANCE VALUE,
S103 . . . IS VEHICLE CONNECTED TO EXTERNAL POWER SOURCE?
S104 . . . INHIBIT STARTUP OF FUEL CELL AND INHIBIT MOVEMENT OF VEHICLE,
S105 . . . LIGHT UP LAMP AND OUTPUT ALARM TONE,
S106 . . . INHIBIT STARTUP OF FUEL CELL AND ENABLE VEHICLE TO MOVE,
B . . . END,
FIG. 3:
A . . . START,
S200 . . . ISOLATE AUXILIARY MACHINE UNIT SUCH AS HEATER FROM EXTERNAL TERMINAL,
S201 . . . DETECT RESISTANCE VALUE,
S202 . . . IS VEHICLE CONNECTED TO EXTERNAL POWER SOURCE?
S203 . . . INHIBIT STARTUP OF FUEL CELL AND INHIBIT MOVEMENT OF VEHICLE,
S204 . . . LIGHT UP LAMP AND OUTPUT ALARM TONE,
S205 . . . INHIBIT STARTUP OF FUEL CELL AND ENABLE VEHICLE TO MOVE,
B . . . END,
FIG. 4:
A . . . START,
S300 . . . IS WARP-UP OF FUEL CELL UNDERWAY?
S301 . . . ISOLATE AUXILIARY MACHINE UNIT SUCH AS HEATER FROM EXTERNAL TERMINAL,
S302 . . . DETECT RESISTANCE VALUE,
S303 . . . IS VEHICLE CONNECTED TO EXTERNAL POWER SOURCE?
S304 . . . FINISH WARMING UP,
S305 . . . EXECUTE WARM-UP BY HEATER ETC FROM EXTERNAL POWER SOURCE,
S306 . . . INHIBIT STARTUP OF FUEL CELL AND INHIBIT MOVEMENT OF VEHICLE,
S307 . . . CONTINUE WARM-UP,
S308 . . . INHIBIT STARTUP OF FUEL CELL AND ENABLE VEHICLE TO MOVE,
S309 . . . CONNECTION DETERMINING PROCESS,
B . . . END,

What is claimed is:

1. A fuel cell system comprising:
a fuel cell mounted in a movable body;
external connecting means connecting said movable body to an external power source provided outside said movable body;
connection determining means determining whether or not said movable body is connected to said external power source via said external connecting means by detecting a resistance via said external connecting means;
an auxiliary machine unit utilized for maintaining and managing an operating environment of said fuel cell; and
power supply control means that controls a supply of electric power to said auxiliary machine unit from said fuel cell and said external power source, wherein:
said power supply control means includes connection switching means that switches over a state between said external connecting means and said auxiliary machine unit to a connected state or a disconnected state, and
said connection determining means determines whether said external power source is connected to said external connecting means or not when a connection between said external connecting means and said auxiliary machine unit is disconnected by said connection switching means.

2. The fuel cell system according to claim 1, further comprising movement inhibiting means inhibiting said movable body from moving if said connection determining means determines that said movable body is connected to said external power source via said external connecting means.

3. The fuel cell system according to claim 2, further comprising notifying means notifying that said movement inhibiting means inhibits said movable body from moving.

4. The fuel cell system according to claim 2, wherein said movable body includes a drive motor that powers said movable body to move, and
said movement inhibiting means cuts off a supply of electric power to said drive motor.

5. The fuel cell system according to claim 1, wherein said auxiliary machine unit is any one of a heater, a pump and a valve.

6. A fuel cell system comprising:
a fuel cell body mounted in a movable body;
an external connecting unit connecting said movable body to an external power source provided outside said movable body; and
a connection determining unit determining whether or not said movable body is connected to said external power source via said external connecting unit by detecting a resistance via said external connecting unit;
an auxiliary machine unit utilized for maintaining and managing an operating environment of said fuel cell body; and
a power supply control unit that controls a supply of electric power to said auxiliary machine unit from said fuel cell body and said external power source, wherein:
said power supply control unit includes a connection switching unit that switches over a state between said external connecting unit and said auxiliary machine unit to a connected state or a disconnected state, and
said connection determining unit determines whether said external power source is connected to said external connecting unit or not when a connection between said external connecting unit and said auxiliary machine unit is disconnected by said connection switching unit.

* * * * *